US008499940B2

(12) United States Patent
Johnson et al.

(10) Patent No.: US 8,499,940 B2
(45) Date of Patent: Aug. 6, 2013

(54) ROTATABLE ARTICLE DISPLAY DEVICE AND METHOD

(75) Inventors: Eric L. Johnson, Knoxville, TN (US); Walter Walsh, III, Knoxville, TN (US); Chris Dotson, Knoxville, TN (US)

(73) Assignee: America's Collectibles Network, Knoxville, TN (US)

( * ) Notice: Subject to any disclaimer, the term of this patent is extended or adjusted under 35 U.S.C. 154(b) by 191 days.

(21) Appl. No.: 13/081,088

(22) Filed: Apr. 6, 2011

(65) Prior Publication Data

US 2012/0086913 A1 Apr. 12, 2012

Related U.S. Application Data

(63) Continuation-in-part of application No. 11/830,884, filed on Jul. 31, 2007, now Pat. No. 7,942,276.

(51) Int. Cl.
*A47F 3/08* (2006.01)

(52) U.S. Cl.
USPC ........................................................ 211/1.53

(58) Field of Classification Search
USPC .............. 211/1.53; 248/122.1, 137–139, 144, 248/371; 356/35, 36; 117/15, 902
See application file for complete search history.

(56) References Cited

U.S. PATENT DOCUMENTS

| 3,790,287 | A | * | 2/1974 | Cuthbert et al. | 356/446 |
| 3,870,880 | A | * | 3/1975 | Merigoux et al. | 378/81 |
| 4,391,520 | A | * | 7/1983 | Ziegel | 356/154 |
| 4,710,259 | A | * | 12/1987 | Howe et al. | 117/15 |
| 5,811,817 | A | * | 9/1998 | Ravich | 250/372 |
| 5,839,424 | A | * | 11/1998 | Hauser | 125/16.02 |
| 6,147,750 | A | * | 11/2000 | Johansson et al. | 356/71 |
| 6,348,964 | B1 | * | 2/2002 | Wagner et al. | 356/30 |
| 7,285,168 | B2 | * | 10/2007 | Bradaczek et al. | 117/69 |
| 7,942,276 | B2 | * | 5/2011 | Johnson et al. | 211/1.53 |
| 8,212,868 | B2 | * | 7/2012 | High | 348/94 |

* cited by examiner

*Primary Examiner* — Jennifer E Novosad
(74) *Attorney, Agent, or Firm* — Pitts & Lake, PC

(57) ABSTRACT

A rotatable article display device for displaying an article such as a piece of jewelry or the like includes a platen defining a display surface. The platen is configured to rotate about a first axis substantially perpendicular to the display surface. A camera mount is provided which is configured to secure a camera to the device such that the camera is rotatable about a second axis substantially parallel to the display surface. In a method for use, at least one article of jewelry is positioned on the display surface and viewed while the platen is rotated about the perpendicular axis and the camera is rotated about the parallel axis.

12 Claims, 13 Drawing Sheets

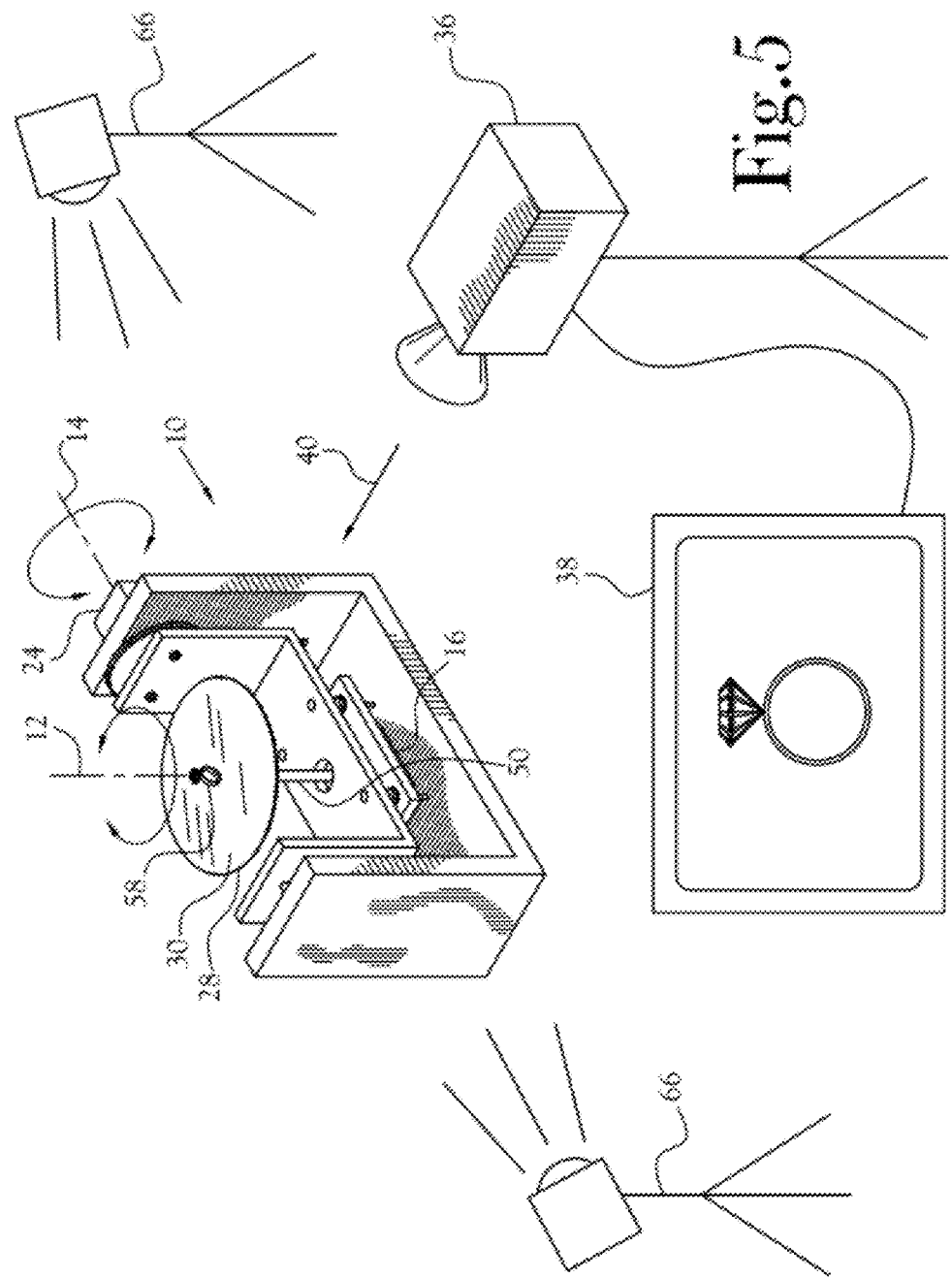

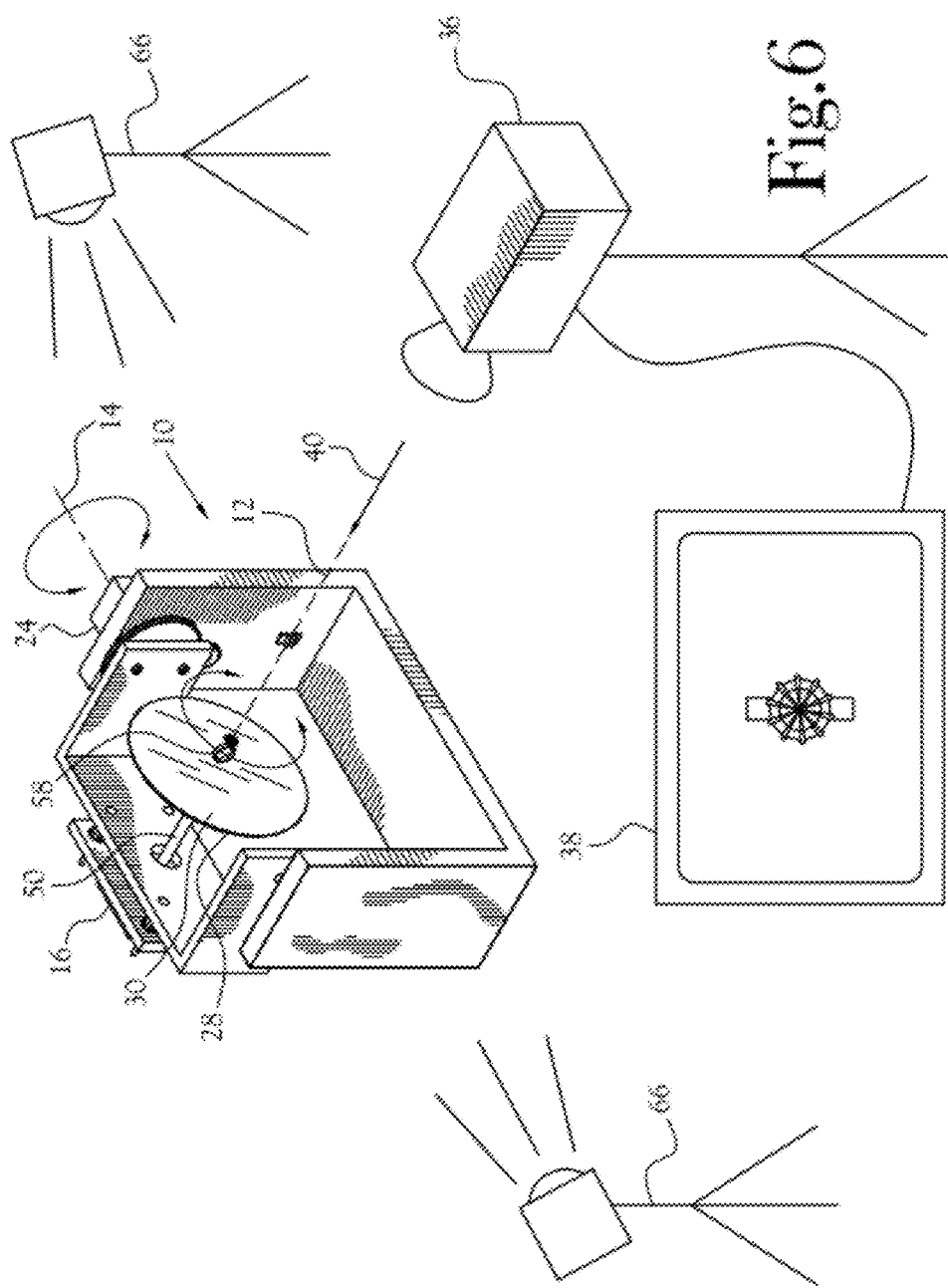

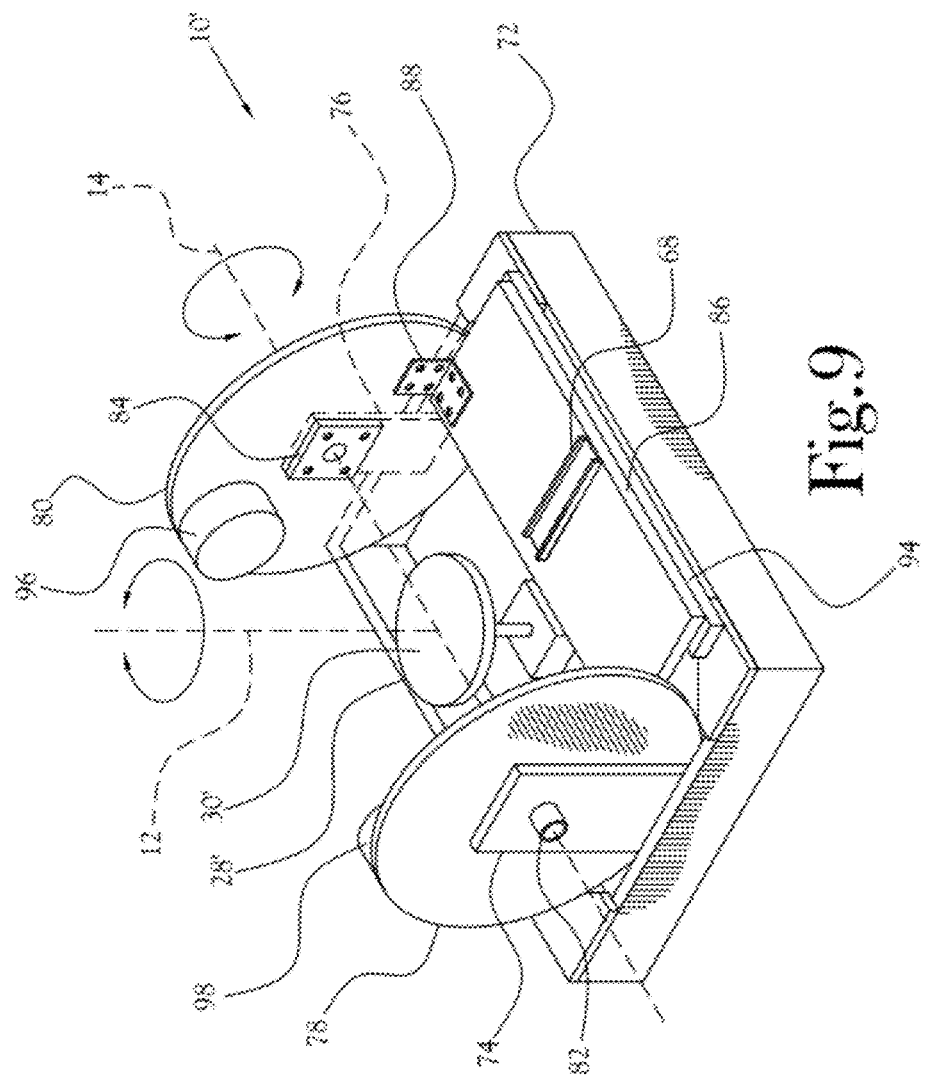

ROTATABLE ARTICLE DISPLAY DEVICE AND METHOD

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of Invention

This invention pertains to a display apparatus. More particularly, this invention pertains to a variably rotating display apparatus for displaying any of a variety of articles in a moving display presentation.

2. Description of the Related Art

Articles such as jewelry, rings, earrings, pendants, bracelets, watches, accessories and other items utilizing typically multifaceted gems, jewels, precious stones, imitation doublets, polished metals, mirrors and the like (hereinafter "articles") are known in the art. These articles exhibit colors and brilliance unique to their shape and refractive properties when light is transmitted, refracted, or reflected in the articles, thereby giving aesthetic stimulations to those who see them. However, these articles cannot provide colors and brilliance unique to their shape and refractive properties unless light is transmitted onto the articles from the outside environment.

In marketing jewelry, one of the goals of on-sale display is to adequately demonstrate to the fullest extent the light capturing, reflecting, and refracting attributes of the article. Demonstrating the color and brilliance of stones used in accessory and jewelry items provides the prospective buyer of such articles an enriched buying experience and further increases the marketability of the articles. Conventional lighting in a static display environment does not allow such enhancement. Specifically, for a prospective purchaser to view the appearance of a stone's light, color and brilliance under a given lighting condition, the prospective purchaser must view the article subjected to the lighting condition from various directions, allowing the prospective purchaser the opportunity to view each of the capturing facets of the article in turn and to observe the way each facet gathers, reflects, and refracts the light from that particular lighting condition. Traditionally, in order to demonstrate all the various colors and refractive capabilities of an article held proximate a fixed light source, a prospective buyer must physically move around the article to view, in turn, each capturing facet as it reacts to the fixed light source.

This traditional method of requiring the prospective purchaser to move around the article poses problems in several marketing applications. For example, in the industry of television-based marketing of articles, such as television-based marketing of jewelry, the prospective purchaser shares the vantage point of the recording television camera. Therefore, for a television-based marketer to demonstrate all the various colors and refractive capabilities of an article held proximate a fixed light source, the marketer must physically move the recording television camera around the article. Such movement often necessitates continual repositioning of cumbersome recording equipment, and the complexity of such an undertaking can often result in degradation of the clarity and smoothness of the image display to the prospective purchaser.

BRIEF SUMMARY OF THE INVENTION

A rotatable article display device is disclosed. The device includes generally a platen defining a display surface, and a base for supporting the platen. The platen is adapted to rotate about an axis which extends perpendicular to the display surface. In one embodiment, the platen is further adapted to rotate about a second axis.

In one embodiment, the base includes an inner yoke and an outer yoke. The inner yoke is pivotally mounted to the outer yoke such as to allow the inner yoke to rotate relative to the outer yoke about the second axis. A first drive mechanism is provided for rotating the inner yoke relative to the outer yoke about the second axis. The inner yoke supports the platen. A second drive mechanism is provided for rotating the platen about the first axis.

In another embodiment, the device includes a mount for securing a camera to the device. In this embodiment, the mount is pivotally secured to the device such that the mount allows the camera to rotate about the second axis.

In certain embodiments, the position of the platen proximate the second axis is adjustable. In more discrete embodiments, a sighting mechanism is provided to identify the intersection between the first axis and the display surface.

BRIEF DESCRIPTION OF THE SEVERAL VIEWS OF THE DRAWINGS

The above-mentioned features of the invention will become more clearly understood from the following detailed description of the invention read together with the drawings in which:

FIG. 5 is a perspective view of the rotatable article display device of FIG. 1, showing a typical article of jewelry displayed on the display surface and a television camera and television viewing the display surface;

FIG. 6 is a perspective view of the rotatable article display device, television camera, and television of FIG. 4, showing the rotatable article display device rotating about perpendicular and parallel axes;

FIG. 9 is a perspective view of another embodiment of a rotatable article display device constructed in accordance with several features of the present invention, showing the mount positioned in a horizontal viewing position;

DETAILED DESCRIPTION OF THE INVENTION

A rotatable article display device (hereinafter the "device") and method for use is disclosed. The device, illustrated generally at 10 in the figures, provides a rotating display surface for displaying an article, including but not limited to a piece of jewelry, a gem, or similar such item, thereby allowing an unmoving observer to view a range of positions and lighting conditions of the displayed item.

Figure 1:
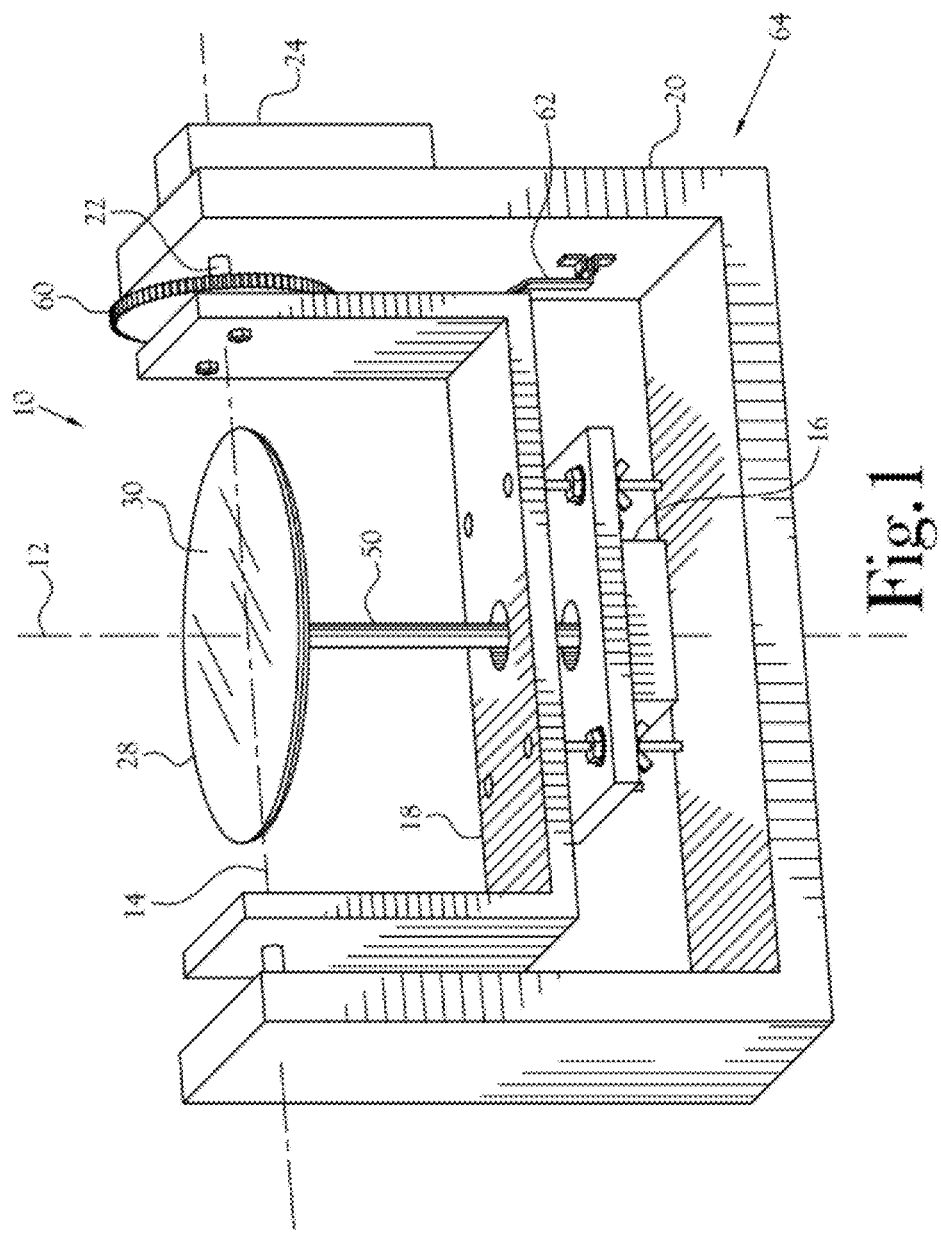
FIG. 1 is a perspective view of one embodiment of a rotatable article display device constructed in accordance with several features of the present invention.

FIG. 1 illustrates a perspective view of one embodiment of the device 10. Referring to FIG. 1, the device 10 includes generally a platen 28 defining a display surface 30, and a base 64 for supporting the platen 28. The platen 28 is adapted to rotate about a first axis 12 which extends perpendicularly to the display surface 30. As will be further discussed below, the platen 28 is further adapted to rotate about a second axis 14 which extends substantially parallel to the display surface 30.

In the illustrated embodiment, the base 64 includes an inner yoke 18 and an outer yoke 20. The inner yoke 18 is pivotally mounted to the outer yoke 20 such as to allow the inner yoke 18 to rotate relative to the outer yoke 20 about the second axis 14. In the illustrated embodiment, the outer yoke 20 supports and mechanically engages a first shaft 22 coaxially along the second axis 14. The first shaft 22 supports the inner yoke 18 in rotational connection to the outer yoke 20 about the second axis 14.

Figure 2:
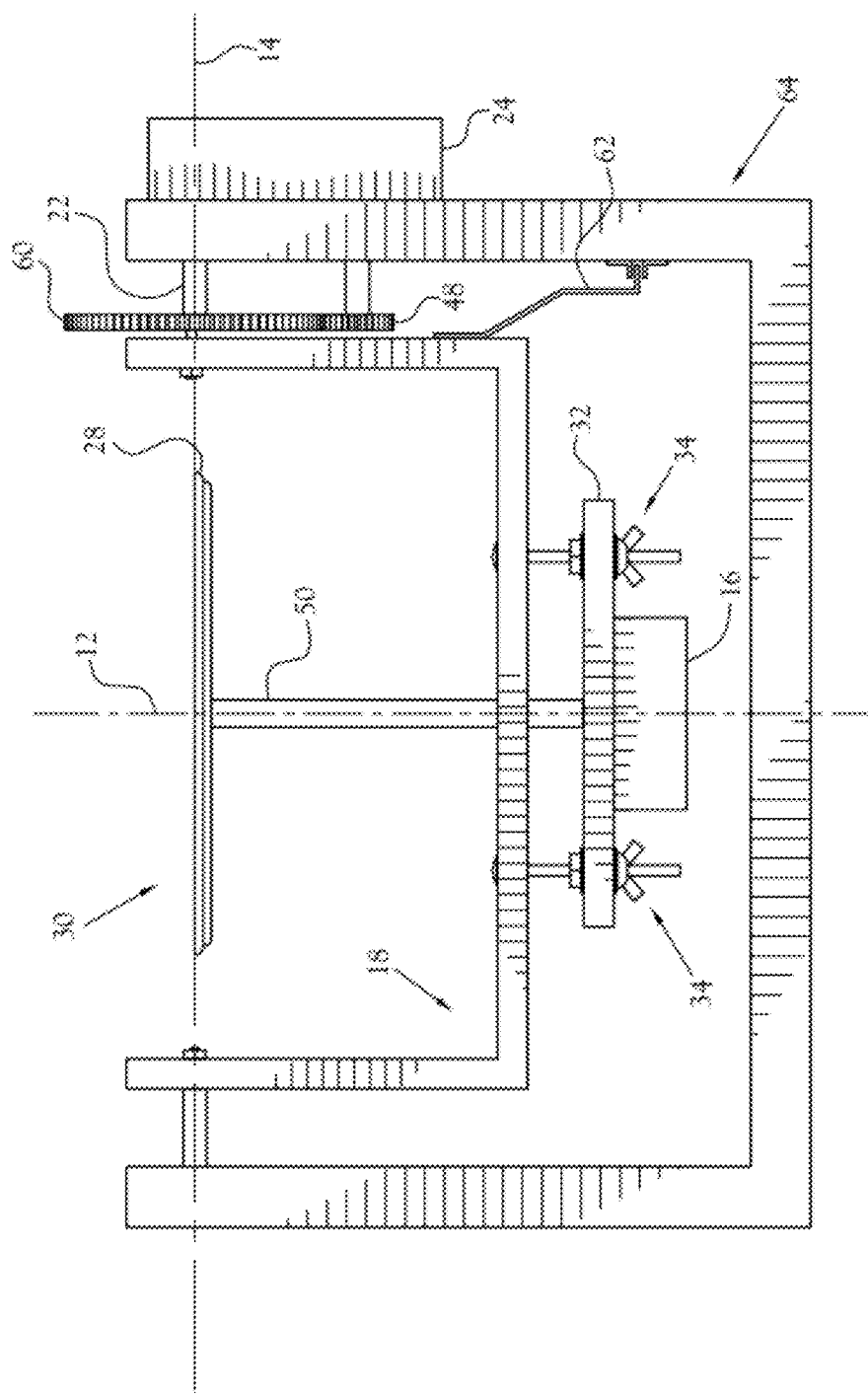
FIG. 2 is a side view of the rotatable article display device of FIG. 1.

A first drive mechanism 24 is provided for rotating the inner yoke 18 relative to the outer yoke 20 about the second axis 14. In the illustrated embodiment, the first shaft 22 is fixed relative to the inner yoke 18. The first drive mechanism 24 is configured to rotate the first shaft 22, thereby causing rotation of the inner yoke 18 about the second axis 14. Referring to FIG. 2, in one embodiment the first drive mechanism 24 is configured to rotate a pinion 48, which in turn rotates a gear 60. The gear 60 is fixed to the first shaft 22. In this configuration, rotation of the pinion 48 by the first drive mechanism 24 results in rotation of the inner yoke 18 about the second axis 14. Those skilled in the art will recognize other suitable devices and configurations for establishing mechanical engagement between the first drive mechanism 24 and the inner yoke 18, and such devices and configurations may be used without departing from the spirit and scope of the present invention.

In the illustrated embodiment of FIG. 2, a stop 62 is provided to prevent the inner yoke 18 from rotating beyond a selected point. In this configuration, the first drive mechanism 24 is configured to oscillate the inner yoke 18 about the second axis 14. In another embodiment, the stop 62 is not included, and the first drive mechanism 24 provides complete rotational movement of the inner yoke 18 about the second axis 14.

Referring now to FIGS. 1 and 2, the inner yoke 18 supports the platen 28. A second drive mechanism 16 is provided for rotating the platen 28 about the first axis 12. In the illustrated embodiment the platen 28 is supported by a second shaft 50 which is interconnected between the platen 28 and the inner yoke 18. The second shaft 50 is configured coaxially along the first axis 12. The second drive mechanism 16 is configured to mechanically rotate the second shaft 50 about the first axis 12, thereby rotating the platen 28 about the first axis 12.

Those skilled in the art will recognize several devices suitable for use to accomplish the first and second drive mechanisms 24, 16 of the present invention, including but not limited to stepping motors, as well as other hydraulically, magnetically and electronically driven mechanisms. It will further be understood that a single mechanism, including but not limited to a gear system, pulley system, and other such mechanisms, may be used to accomplish both first and second drive mechanisms 24, 16 in an integral device, without departing from the spirit and scope of the present invention.

In several embodiments, the device 10 further includes a mechanism for adjusting the height of the display surface 30 relative to the second axis 14. Those skilled in the art will recognize numerous devices suitable for accomplishing such adjustability of the positioning of the display surface 30. For example, as better illustrated in FIG. 2, the inner yoke 18 of the present embodiment supports a positioning member 32. The positioning member 32 is adjustably secured to the inner yoke 18 such that the positioning member 32 is selectively repositionable relative to the second axis 14. The second shaft 50 is interconnected between the platen 28 and the positioning member 32. In this configuration, repositioning of the positioning member 32 relative to the second axis 14 results in repositioning of the display surface 30 proximate the second axis 14.

In the illustrated embodiment, a plurality of adjustable nut and bolt assemblies 34 connects the positioning member 32 to the inner yoke 18 such as to allow the positioning member 32 to be repositioned proximate the inner yoke 18.

In another embodiment, the inner yoke 18 and the positioning member 32 are slidably attached. Those skilled in the art will recognize other suitable devices for use in establishing the adjustable connection between the inner yoke 18 and the positioning member 32.

Figure 3:
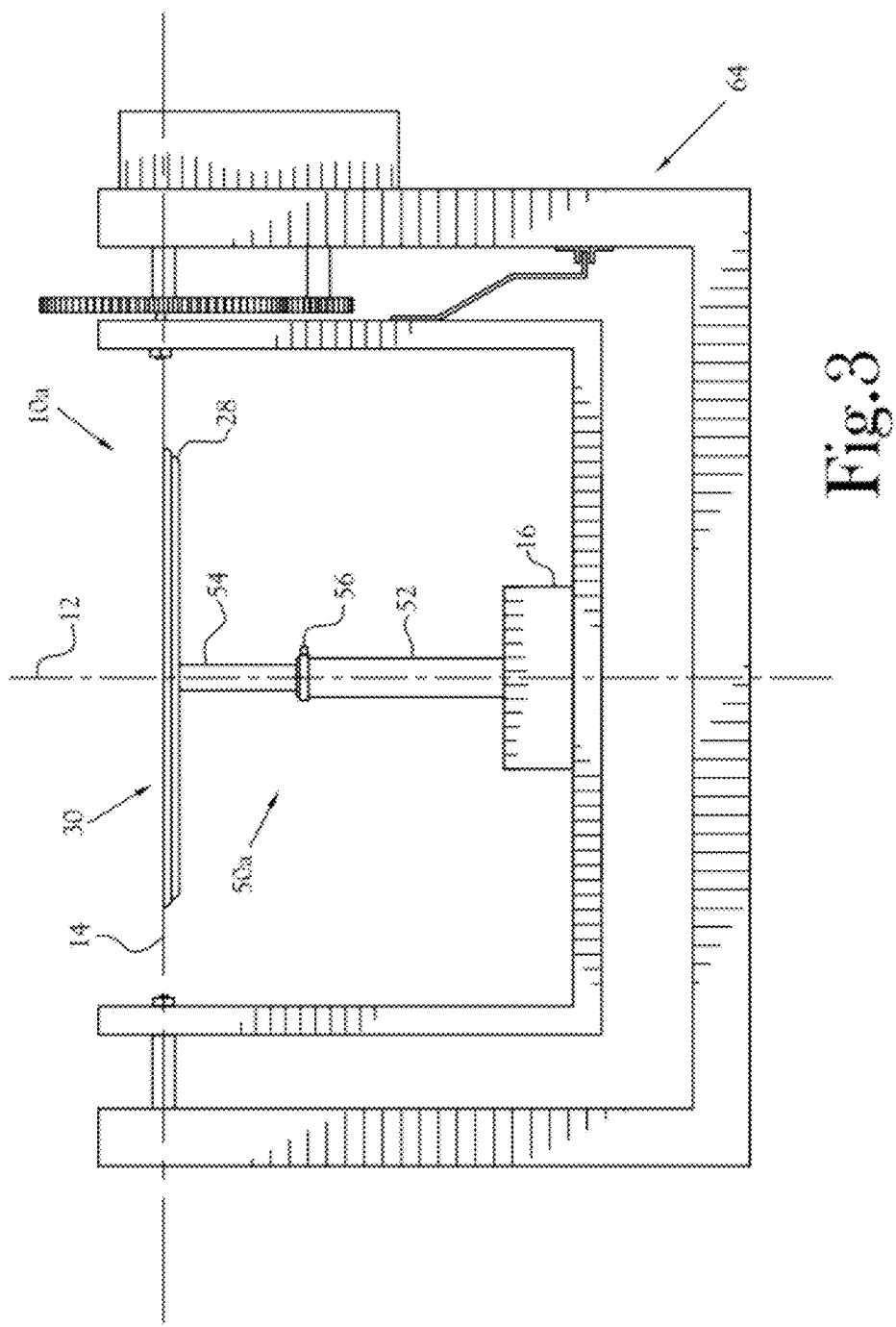
FIG. 3 is a side view of another embodiment of the rotatable article display device.

FIG. 3 illustrates another embodiment of the device 10a. In this embodiment, the second shaft 50a is defined by a telescopically adjustable member having a proximal portion 52 and a distal portion 54. The proximal portion 52 is secured to the second drive mechanism 16 such as to allow the second drive mechanism 16 to rotate the proximal portion 52 about the first axis 12. The distal portion 54 is fixed to the platen 28. The distal portion 54 is in telescopic engagement with the proximal portion 52. An adjustable connector 56 is provided to allow the distal portion 54 to be selectively extended and retracted proximate the proximal portion 52 substantially along the first axis 12. In this configuration, the platen 28 is selectively repositionable proximate the inner yoke 18, thereby allowing the display surface 30 to be selectively repositionable relative to the second axis 14. Those skilled in the art will recognize various connectors, including clamps, frictional connectors, and other connectors suitable to accomplish the adjustable connector 56 of the present invention.

Figure 4:
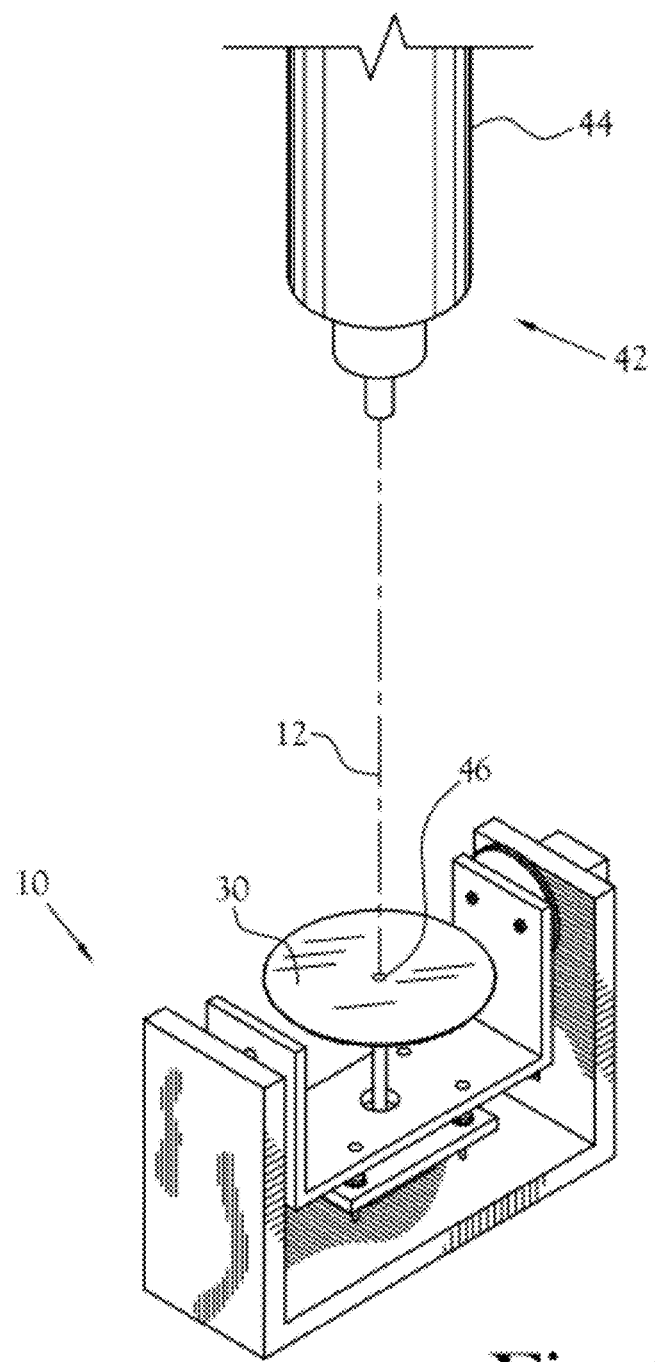
FIG. 4 is a perspective view of an embodiment of the rotatable article display device including a sighting mechanism.
Figure 7A:
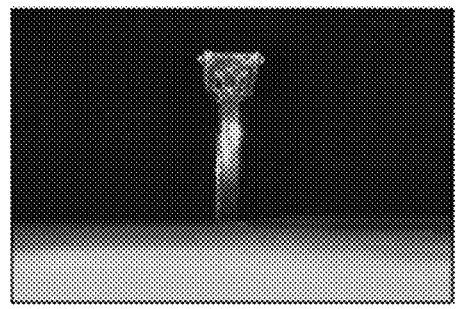
FIGS. 7a-7l illustrate a series of display images achieved through one application of the rotatable article display device.
Figure 7B:
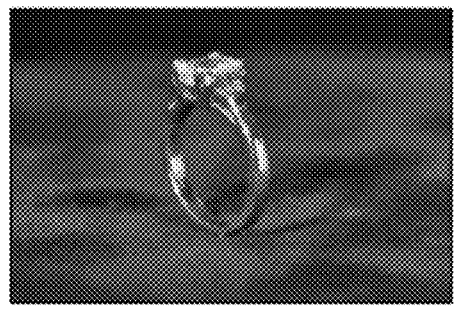
Figure 7C:
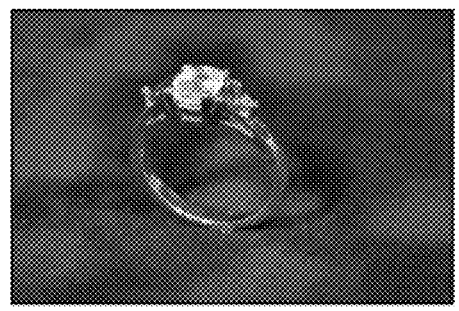
Figure 7D:
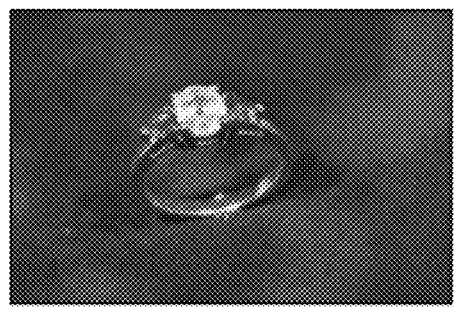
Figure 7E:
Figure 7F:
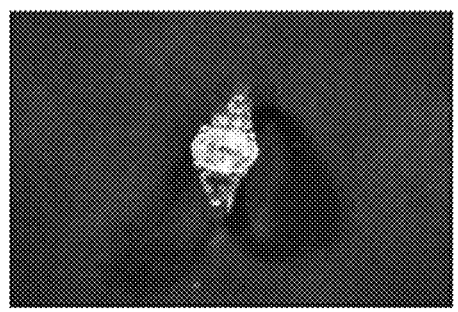
Figure 7G:
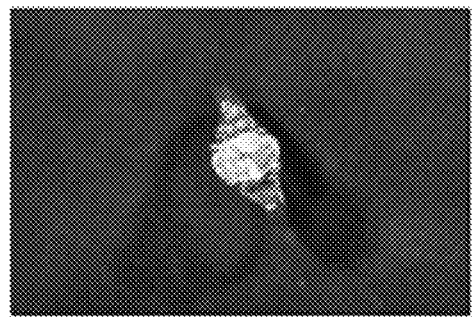
Figure 7H:
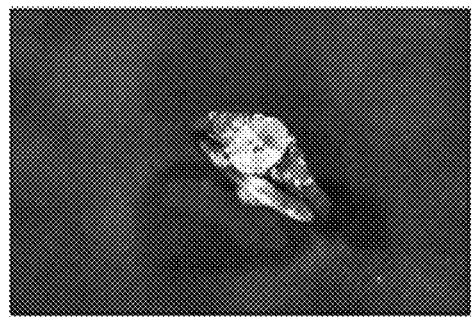
Figure 7I:
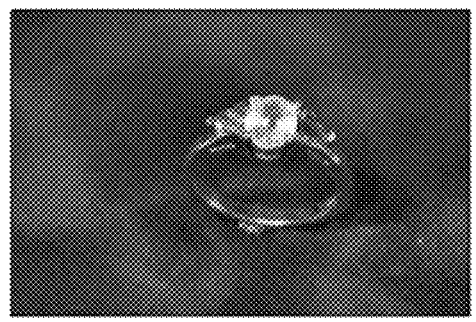
Figure 7J:
Figure 7K:
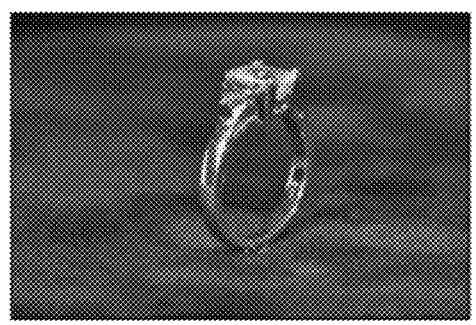
Figure 7L:
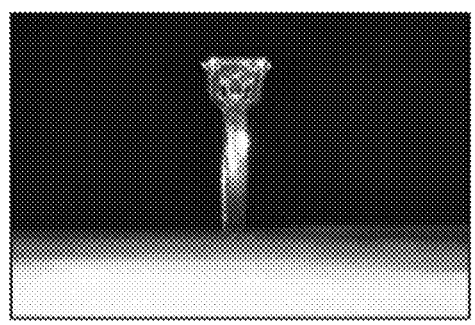

FIG. 4 shows an optional feature of the device 10 of the present invention. In the embodiment of FIG. 4, a sighting mechanism 42 is provided to identify the intersection between the first axis 12 and the display surface 30. In the illustrated embodiment, the sighting mechanism 42 is defined by a laser device 44. The laser device 44 is configured to project a laser mark 46 substantially downwardly and onto the display surface 30. The laser device 44 is configured such that the laser mark 46 appears at an intersection of the first axis 12 and the display surface 30 when the display surface 30 is rotated such that the first axis 12 is in a substantially vertical configuration. In another embodiment, the sighting mechanism 42 is defined by a scope sighted to visually indicate the location of the intersection of the first axis 12 and the display surface 30. Those skilled in the art will recognize other devices suitable for use to accomplish the sighting mechanism 42 of the present invention.

The sighting mechanism 42 allows a user to locate a point on the display surface 30 that intersects with the first axis 12. Once located, the user is able to position an article 58 on the display surface 30 in substantial alignment with the first axis 12. After positioning the article 58, the user is then able to adjust the positioning of the display surface 30 such as to bring the article 58 into substantial alignment with the second axis 14.

FIGS. 5 and 6 illustrate one method for using the device 10. As shown in FIGS. 5 and 6, an article 58 is positioned on the display surface 30, proximate the intersection of the first axis 12 and the second axis 14, using a suitable fastener, such as adhesive, hook and loop, clamp, or other such fastener. The user then adjusts the height of the display surface 30 to position the article 58 in a desirable configuration relative to the second axis 14. At least one lighting device 66 is provided in order to provide light to the display surface 30 and the article 58. The device 10 is then activated, including activation of the first and second drive mechanisms 24, 16. Upon activation of the first drive mechanism 24, the first drive mechanism 24 rotates the first shaft 22, which in turn rotates the inner yoke 18 about the second axis 14. Upon activation of the second drive mechanism 16, the second drive mechanism 16 rotates the second shaft 50. The second shaft 50 then mechanically engages the platen 28 to rotate the platen 28 about the first axis 12.

Referring to FIG. 5, a viewer 36 is shown, represented by a motion-picture camera positioned to record an image of the article 58 mounted to the display surface 30. For the sake of illustration, a television display 38 illustrating the specific view point 40 of the motion-picture camera is shown. FIG. 5 shows the device 10 with the first axis 12 beginning in a substantially vertical configuration, the second axis 14 in a substantially horizontal configuration, and the viewer 36 configured to view the article 58 along a line of sight substantially perpendicular to the second axis 14. In this configuration, the viewer 36 perceives the article 58 as being displayed from a side view. As shown in FIG. 6, as the display surface 30 rotates about both perpendicular and parallel axes 12, 14, the viewer 36 perceives the article 58 as both rotating and tilting, allowing the viewer (in the present illustration, the motion-picture camera) to view the article 58 from a variety of angles.

Referring now to FIGS. 5 and 6, in the illustrated embodiment, the first drive mechanism 24 is configured to oscillate the inner yoke 18. In operation, the first drive mechanism 24 rotates the inner yoke 18 about the second axis 14 from a position in which the first axis 12 is substantially vertical (FIG. 5) to a position in which the first axis 12 is substantially horizontal (FIG. 6). Thereafter, the first drive mechanism 24 returns the inner yoke 18 to the position in which the first axis 12 is substantially vertical. In this configuration, the viewer 36 perceives the article 58 as though the viewer were beginning on one side of the article 58, flying through various points around the article 58, and landing on another side of the article 58, all the while viewing the article 58. In reality, of course, the viewer 36 remains motionless, while the device 10 moves the article 58 proximate the viewer 36, thereby creating such illusion.

FIGS. 7a-7l better illustrate the perception of the viewer 36 created through one embodiment of the method invention. In the embodiment of the method invention utilized in FIGS. 7a-7l, following placement of the article 58 on the display surface 30, the user adjusts the height of the display surface 30 to position the article 58 such as to substantially intersect with the second axis 14. The device 10 is then activated, including activation of the first and second drive mechanisms 24, 16, whereupon the viewer 36 views the display surface 30. In this configuration, as the display surface 30 rotates about both perpendicular and parallel axes 12, 14, the viewer 36 perceives the article 58 as though the viewer 36 were traveling throughout various points around the article 58, all the while viewing the article 58.

Those skilled in the art will recognize that the device 10 is capable of providing a variety of viewing presentations of an article 58 secured to the display surface 30. For example, in the illustrated embodiment, as the display surface 30 rotates about both perpendicular and parallel axes 12, 14, the viewer 36 perceives the article 58 as though the viewer 36 were flying in a spiral-shaped path from a point on one side of the article 58 to a point directly over top of the article 58 and viewing the article 58 from directly overhead (see FIGS. 7a-7f). As the display surface 30 continues to rotate about both perpendicular and parallel axes 12, 14, the viewer 36 then perceives the article 58 as though the viewer 36 were returning to the side of the article 58 along a similarly-shaped spiral path (see FIGS. 7g-7l).

Figure 8A:
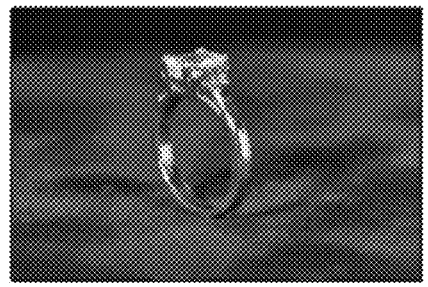
FIGS. 8a-8l illustrate a series of display images achieved through another application of the rotatable article display device.
Figure 8B:
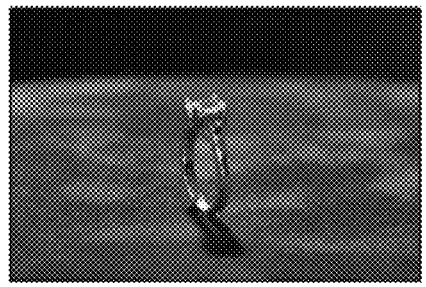
Figure 8C:
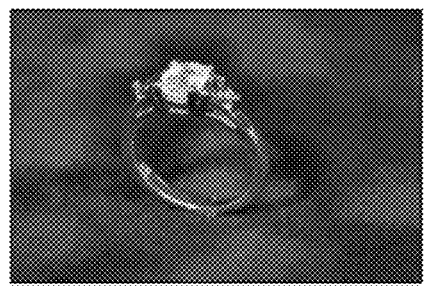
Figure 8D:
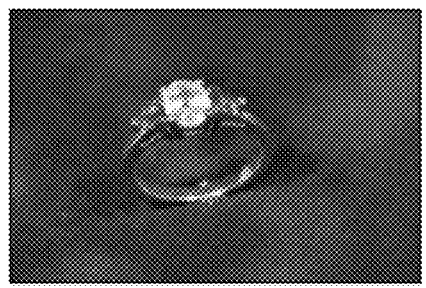
Figure 8E:
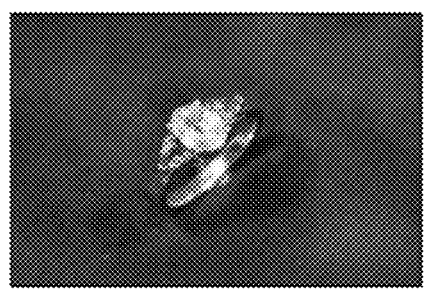
Figure 8F:
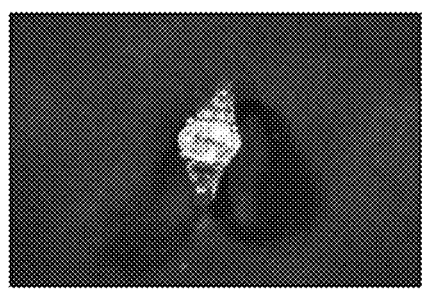
Figure 8G:
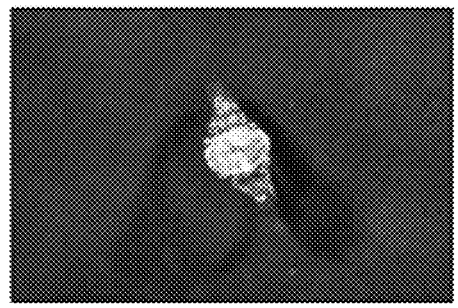
Figure 8H:
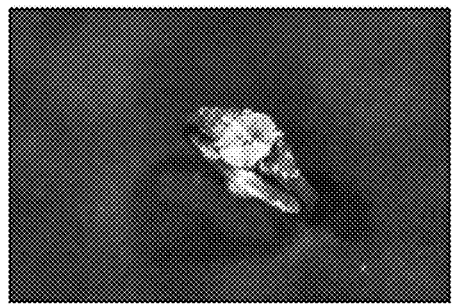
Figure 8I:
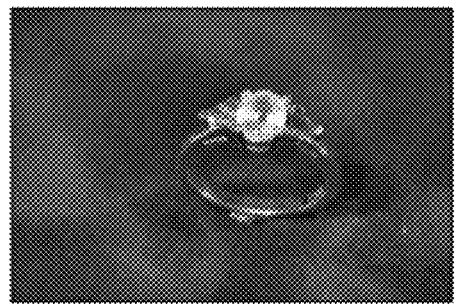
Figure 8J:
Figure 8K:
Figure 8L:
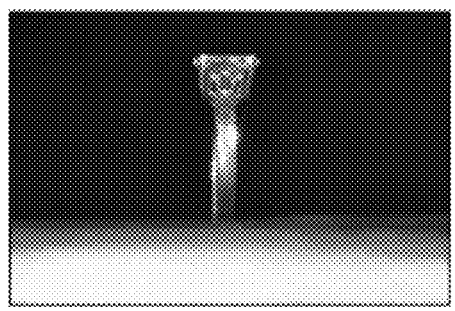

FIGS. 8a-8l illustrate the perception of the viewer 36 created through another embodiment of the method invention. In this embodiment, following placement of the article 58 on the display surface 30, the user adjusts the height of the display surface 30 to position the article 58 such that the article 58 does not intersect with the second axis 14. In this configuration, when the device 10 is activated and the viewer 36 views the display surface 30, the viewer 36 perceives the article 58 as though the viewer 36 were flying in a spiral-shaped path from a point on one side of the article 58, to a point above yet slightly offset from the article 58 (see FIGS. 8a-8f). In the illustrated embodiment, the article 58 is initially positioned substantially above the second axis 14. As shown in FIGS. 8f and 8g, positioning the article 58 above the second axis 14 results in the article 58 appearing to offset substantially below the center of the image perceived by the viewer 36. Likewise, it will be understood by one skilled in the art that positioning the article 58 below the second axis 14 results in the article 58 appearing to offset substantially above the center of the image perceived by the viewer 36. As shown in FIGS. 8g-8l, as the display surface 30 continues to rotate about both perpendicular and parallel axes 12, 14, the viewer 36 then perceives the article 58 as though the viewer 36 were returning to the side of the article 58 along a similarly-shaped spiral path.

In yet another embodiment, the display surface 30 is configured to rotate first about the perpendicular axis 12, and then about the parallel axis 14. In this embodiment, as the display surface 30 rotates, the viewer 36 perceives the article 58 as though the viewer 36 were traveling in a circular path in the plane of the display surface 30 and then flying over the article 58, all while viewing the article 58. In still another embodiment, the viewer 36 is configured to view the article 58 along a line of sight which is not perpendicular to the second axis 14. In this embodiment, as the display surface 30 rotates about the second axis 14, the viewer 36 perceives the article 58 as though the viewer 36 were elevated above the article 58 and viewing the article at a downward angle. Those skilled in the art will recognize numerous other viewing presentations that the device 10 is capable of providing.

Those skilled in the art will recognize that either of the first and second driving mechanisms 24, 16 may be configured to oscillate or rotate corresponding shafts 22, 50 about respective axes 14, 12 without departing from the spirit and scope of the present invention. Similarly, it will be further understood that both first and second driving mechanisms 24, 16 may be configured to oscillate or rotate corresponding shafts 22, 50 about corresponding axes 14, 12.

Figure 10:
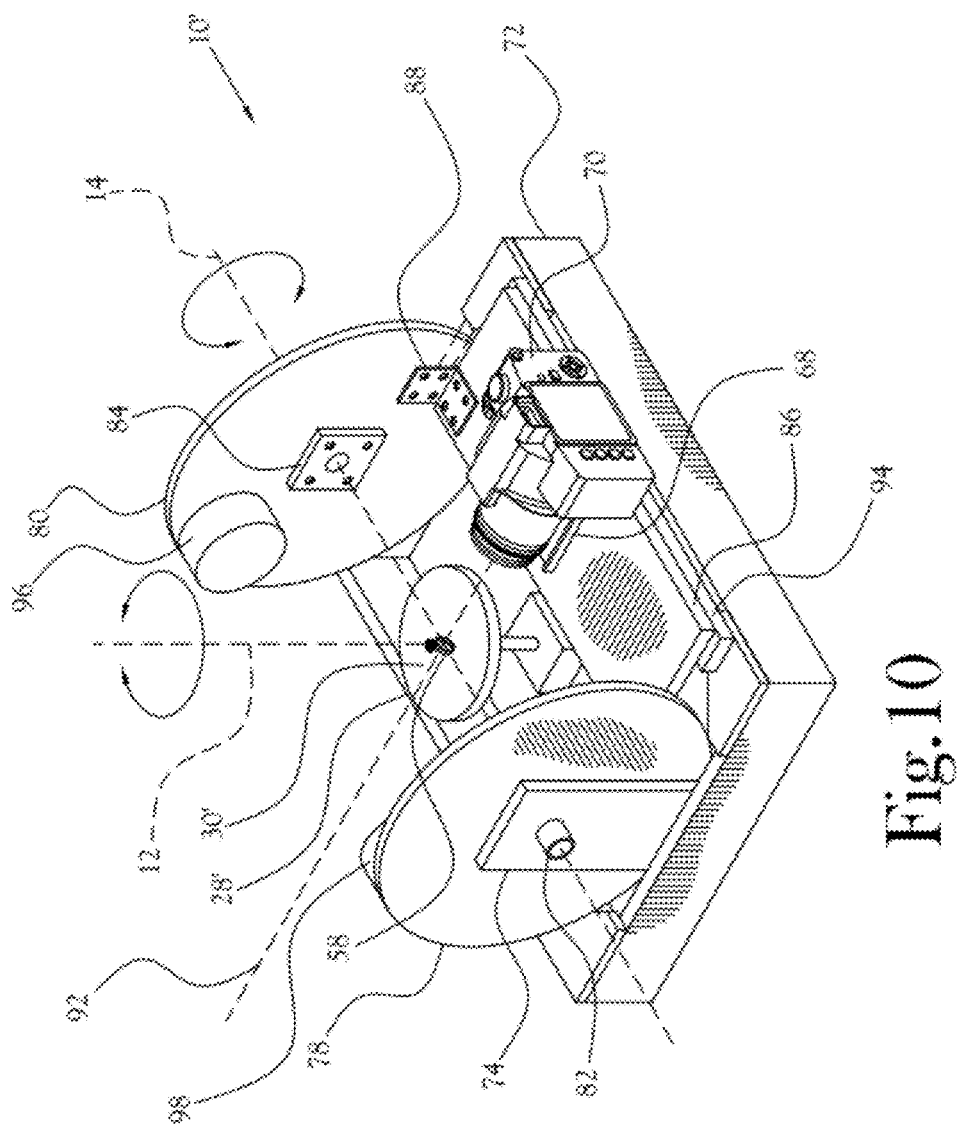
FIG. 10 is a perspective view of the rotatable article display device of FIG. 9 showing a camera mounted on the mount.
Figure 11:
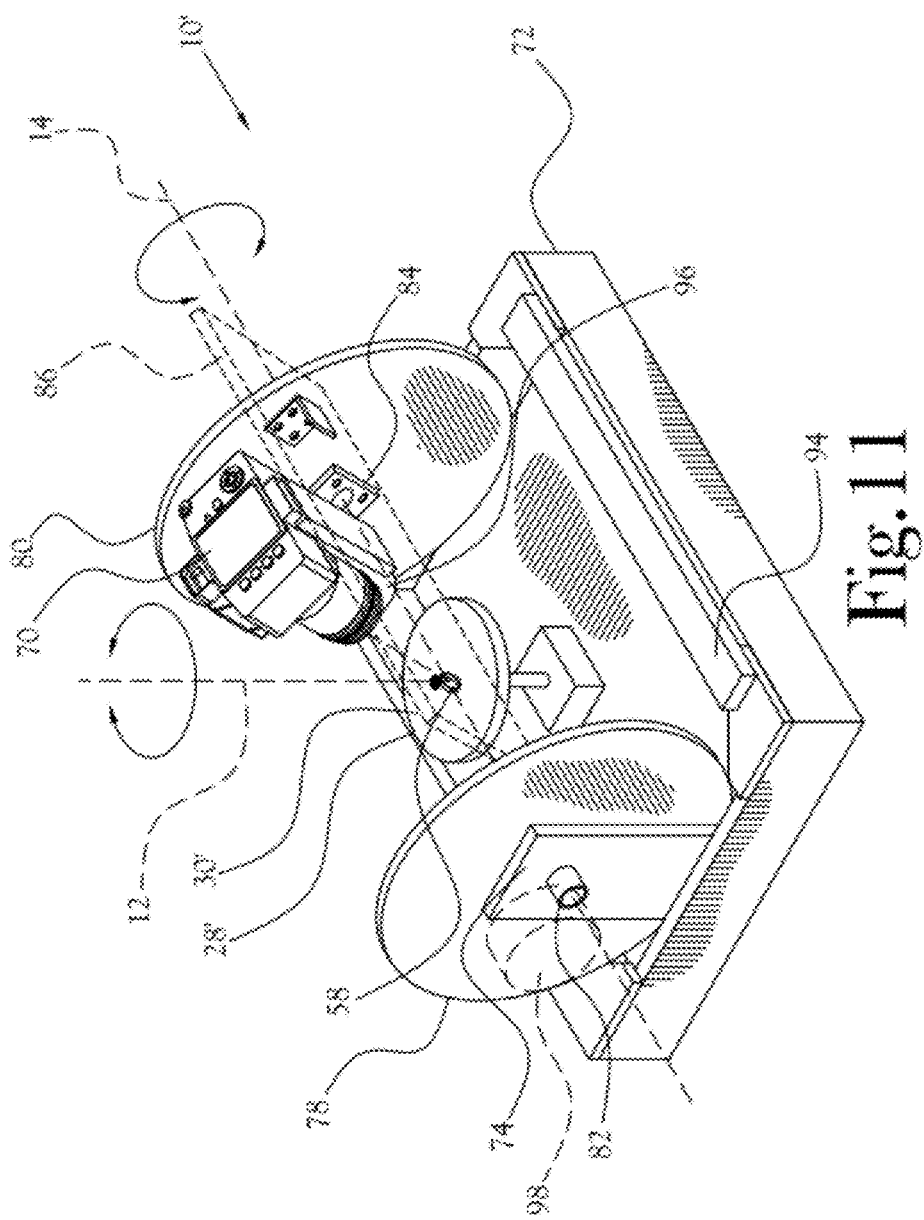
FIG. 11 is a perspective view of the rotatable article display device of FIG. 9 showing the mount rotated upward to a downward viewing position.

FIGS. 9-11 illustrate another embodiment of the device 10'. In the embodiment of FIGS. 9-11, the device 10' includes a mount 68 for securing a camera 70 to the device 10'. The mount 68 is pivotally secured to the device 10' such that the device 10' allows the camera 70 to rotate along a vertical plane about the parallel axis 14 while maintaining the viewing direction of the camera 70 in alignment with the display surface 30' of the platen 28'. Thus, in this embodiment, the platen 28' is rotatable about the perpendicular axis 12 but not rotatable about the parallel axis 14.

Referring to FIG. 9, in one embodiment, the device 10' includes a platen 28' which, as discussed above, defines a vertically-adjustable display surface 30' and is configured to rotate about an axis 12 perpendicular to the display surface 30'. As discussed above with regard to FIG. 4, in one embodiment, a sighting mechanism (not shown), such as a laser sighting mechanism, telescopic sighting mechanism, or other suitable sighting mechanism, is optionally provided to identify the intersection between the first axis 12 and the display surface 30'. A base frame 72 is provided which is configured to support the remainder of the device 10' from a supporting surface, such as a table, floor, or other surface. In the illustrated embodiment, the platen 28' is detached from the remainder of the device 10' such that the base frame 72 surrounds, but is not secured to, the platen 28'. In another embodiment (not shown), the platen 28' is secured to the base frame 72 by suitable attachment members.

A pair of vertical support members 74, 76 are provided, with one vertical support member 74 being disposed at one end of the base frame 72 and another vertical support member 76 being disposed at an opposite end of the base frame 72. The vertical support members 74, 76 extend generally upwardly to define an axis 14 extending between upper ends thereof which, as discussed above, is generally parallel to the display surface 30' of the platen 28'. A pair of rotatable support members 78, 80 are provided, with one rotatable support member 78, 80 being rotatably secured to each upper end of the vertical support members 74, 76 by suitable axles 82 and mounting apparatus 84. In the illustrated embodiment, each rotatable support member 78, 80 is defined by a substantially planar circular disk which is rotatably mounted at a central portion thereof to a cooperating vertical support member 74, 76 in a configuration perpendicular to the parallel axis 14. Thus, each disk is rotatable along a plane defined by the disk and about the parallel axis 14. However, those skilled in the art will recognize other suitable shapes for the rotatable support members 78, 80 which may be used without departing from the spirit and scope of the present invention.

Referring now to FIGS. 9 and 10, the camera mount 68 is mounted between the rotatable support members 78, 80 such that rotation of the rotatable support members 78, 80 about the parallel axis 14 results in rotation of the camera mount 68 about the parallel axis 14. In the illustrated embodiment, a cantilevered platform 86 is fixed by suitable fasteners 88 to span between the rotatable support members 78, 80. Thus, the rotatable support members 78, 80 are fixed in relation to the platform 86, the camera mount 68, and to one another. In the illustrated embodiment, the camera mount 68 consists of a typical channel-shaped camera mount of the type known to one of ordinary skill in the art, which is adapted to be slidably received by suitable grooves defined by an underside mounting surface of a camera 70 and fixed in relation to the camera 70 by suitable locking mechanisms, such as for example, snapping latches, set screws, or the like. However, it will be understood that numerous designs and configurations of camera mounts exist which are suitable to mount the camera 70 to the device 10', and that such camera mounts may be used without departing from the spirit and scope of the present invention.

As shown in FIGS. 10 and 11, the platform 86 is fixed at a location along the rotatable support members 78, 80 offset from the parallel axis 14 such that the camera 70, when mounted on the camera mount 68, has a viewing direction 92 which is maintained in substantial alignment with an article 58 positioned on the display surface 30'. Thus, as shown in FIGS. 10 and 11, rotation of the rotatable support members 78, 80 about the parallel axis 14, together with rotation of the display surface 30' about the perpendicular axis 12, results in the viewing direction 92 of the camera 70 beginning with an orientation viewing one side of the article 58 (FIG. 10), and then flying through various points around the article 58 (FIG. 11), and landing on another side of the article 58, all the while continuing to view the article 58. In the illustrated embodiment, suitable stops 94 are provided between the base 72 and the platform 86 to limit rotational movement of the camera 70 below the base 72. However, it will be understood that inclusion of the stops 94 is not necessary to accomplish the present invention.

It will be understood that, in several embodiments, suitable driving mechanisms (not shown) are provided to drive rotation of the rotatable support member 78, 80 about the parallel axis 14. To this extent, in the illustrated embodiment, a pair of counterweights 96, 98 are provided to at least partially balance and offset the weight of at least one of the platform 86 and the camera 70, thereby reducing the rotational force required to drive rotation of the rotatable support member 78, 80 about the parallel axis 14. In the illustrated embodiment, each of the counterweights 96, 98 consists of a cylindrical mass of relatively heavy material, such as for example lead, steel, or other such material, which is secured to a cooperating rotatable support member 78, 80 at a point opposite the rotatable support member 78, 80 from the fasteners 88 which secure the platform 86 to the rotatable support members 78, 80. However, those skilled in the art will recognize other suitable designs and configurations for the counterweights 96, 98 which may be used without departing from the spirit and scope of the present invention.

From the aforementioned, it will be understood that the device 10 provides a variably rotating display surface 30, which rotates proximate an observer. As such, an observer of the display surface 30 is able to view a range of orientations of an item displayed upon the display surface 30.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A rotatable article display device for displaying articles, said rotatable article display device comprising:
   a platen defining a display surface, said display surface defining a first axis extending substantially perpendicular to said display surface;
   a device for rotating said platen about said first axis; and
   a base carrying and supporting a camera mount, said base defining a second axis extending substantially parallel to said display surface, said camera mount being rotatable in relation to said display surface about said second axis; said base further comprising:
 at least one support member having a lower end and an upper end; and
 at least one rotatable member rotatably connected to said support member upper end such that said at least one rotatable member is rotatable about said second axis;
 wherein said camera mount is fixed in relation to said at least one rotatable member.

2. The rotatable article display device of claim 1, said base further comprising a first support member and a second support member, each support member having a lower end and an upper end, said second axis being defined by a line intersecting each said support member upper end.

3. The rotatable article display device of claim 2, said at least one rotatable member further comprising:
 a first disk and a second disk, each said disk being rotatably secured substantially perpendicular to said second axis at a central portion of said disk to a cooperating support member upper end at an intersection of said support member upper end with said second axis, each said disk being rotatable about said second axis in relation to said display surface.

4. The rotatable article display device of claim 3, wherein said platen is selectively repositionable relative to said second axis.

5. The rotatable article display device of claim 3 further comprising:
 a platform fixed to each of said disks, said platform having said camera mount secured thereto.

6. The rotatable article display device of claim 5 further defining a drive mechanism configured to rotate at least one of said disks about said second axis.

7. The rotatable article display device of claim 6 further including a camera adapted to be mounted to said camera mount such that said camera mount maintains a viewing direction of said camera in substantial alignment with an intersection of said first and second axes.

8. The rotatable article display device of claim 7, wherein said camera is a motion picture camera.

9. The rotatable article display device of claim 6 further comprising a sighting mechanism configured to indicate a point of intersection between said display surface and said first axis.

10. The rotatable article display device of claim 9, said sighting mechanism comprising a laser device configured to project a laser mark onto said display surface at an intersection of said first axis and said display surface.

11. The rotatable article display device of claim 9, said sighting mechanism comprising a scope sighted to visually indicate the location of the intersection of said first axis and said display surface.

12. A rotatable article display device for displaying articles, said rotatable article display device comprising:
 a platen defining a display surface, said display surface defining a first axis extending substantially perpendicular to said display surface;
 a device for rotating said platen about said first axis; and
 a base for carrying and supporting a camera mount, said base defining:
 a first support member and a second support member, each support member having a lower end and an upper end, said base defining a second axis intersecting each said support member upper end;
 a first disk and a second disk, each said disk being rotatably secured substantially perpendicular to said second axis at a central portion of said disk to a cooperating support member upper end at an intersection of said support member upper end with said second axis, each said disk being rotatable in relation to said display surface about said second axis;
 a platform fixed to each of said disks, said platform having said camera mount secured thereto such that said camera mount is fixed in relation to said disks; and
 a drive mechanism configured to rotate at least one of said disks about said second axis;
 wherein said platen is selectively repositionable relative to said second axis, and wherein said first axis and said second axis substantially intersect.

* * * * *